United States Patent
Yang

(10) Patent No.: US 7,114,016 B2
(45) Date of Patent: Sep. 26, 2006

(54) PAGE-AWARE DESCRIPTOR MANAGEMENT

(75) Inventor: Chengda Yang, Auburndale, MA (US)

(73) Assignee: Intel Corporation, Santa Clara, CA (US)

( * ) Notice: Subject to any disclaimer, the term of this patent is extended or adjusted under 35 U.S.C. 154(b) by 416 days.

(21) Appl. No.: 10/745,001

(22) Filed: Dec. 23, 2003

(65) Prior Publication Data

US 2005/0138212 A1   Jun. 23, 2005

(51) Int. Cl.
    G06F 13/00   (2006.01)
(52) U.S. Cl. .......................... 710/56; 710/22; 710/32; 711/170; 711/202; 709/213; 709/230
(58) Field of Classification Search ............ 710/22–24, 710/32–35, 52–56, 310; 711/202–208, 153, 711/165, 170–173; 709/230–236; 370/413, 370/468, 474
See application file for complete search history.

(56) References Cited

U.S. PATENT DOCUMENTS

| | | | | |
|---|---|---|---|---|
| 5,606,665 A * | 2/1997 | Yang et al. | .................. | 711/154 |
| 6,067,300 A * | 5/2000 | Baumert et al. | ............ | 370/413 |
| 6,154,823 A * | 11/2000 | Benayon et al. | ............ | 711/171 |
| 6,169,748 B1 * | 1/2001 | Barbas et al. | ................ | 370/468 |
| 6,532,503 B1 * | 3/2003 | Lindeborg et al. | ............ | 710/52 |
| 6,553,438 B1 * | 4/2003 | Coffman et al. | .............. | 710/52 |
| 6,804,766 B1 * | 10/2004 | Noel et al. | ................... | 711/203 |
| 7,007,146 B1 * | 2/2006 | Romanufa et al. | .......... | 711/165 |
| 2001/0039607 A1 * | 11/2001 | Goldstein et al. | ........... | 711/170 |
| 2004/0218631 A1 * | 11/2004 | Ganfield | ..................... | 370/474 |
| 2005/0033874 A1 * | 2/2005 | Futral et al. | ................... | 710/22 |

* cited by examiner

Primary Examiner—Christopher Shin
(74) Attorney, Agent, or Firm—Daly, Crowley, Mofford & Durkee, LLP

(57) ABSTRACT

A method and apparatus to provide network buffer descriptors grouped by memory page into page groups and access a list of the page groups to manage the allocation and de-allocation of the network buffers descriptors is presented.

24 Claims, 12 Drawing Sheets

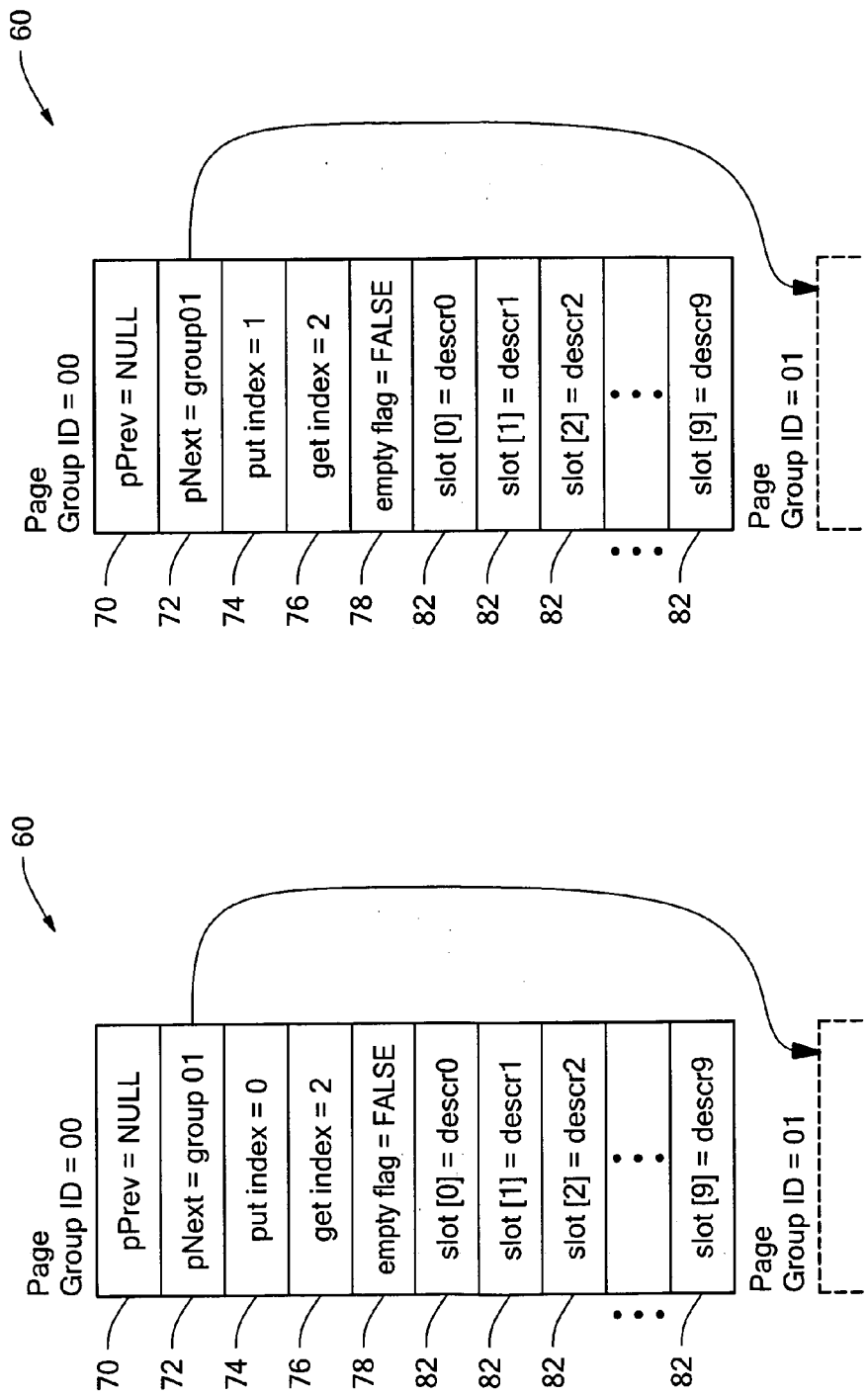

```
typedef struct
{
    int pageGroupId;
    /* Other members of the descriptor */
    ---
} DESCRIPTOR;

typedef struct
{
    PAGE_GROUP *pPrev;
    PAGE_GROUP *pNext;
    int putIndex;
    int getIndex;
    int emptyFlag;
    DESCRIPTOR *pDescriptor [10]; /* One page group holds 10 descriptors. */
} PAGE_GROUP;

/* These are all in the cached memory. */
PAGE_GROUP pageGroup [99];
PAGE_GROUP *pPoolTop;
PAGE_GROUP *pPoolBottom;

PoolInit ( )
{
    Allocate memory for all descriptors.
    Allocate memory for all bodies
    Fill descriptors as usual.
    Group descriptors into page groups according to their addresses and MMU page size.
    For each descriptor, initialize descriptor-->pageGroupId. Notice, the pageGroupId will never be changed.
    Form the pool list of page groups by linking them one after another.
    pPoolTop = &pageGroup [10];
    pPoolBottom = &pageGroup [99];
}
```

```
/* Call this function to get a buffer. */
DESCRIPTOR *PoolBufferGet ( )
{
  PAGE_GROUP *page;
  DESCRIPTOR *descriptor;

/* Always get buffer from the head of the top page group. */
  descriptor = pPoolTop --> pDescriptor [pPoolTop --> getIndex];
  pPool -->getIndex++;
  if (pPoolTop -->getIndex --> = 10)
     pPoolTop -->getIndex = 0;
  if (pPoolTop -->getIndex == pPoolTop -->putIndex)
     pPoolTop -->emptyFlag = TRUE;

/* if the top page group become empty. */
  if (pPoolTop -->emptyFlag == TRUE)
  {
     /* Move the current top page group to bottom
     and move the next to the to the top. */
     page = pPoolTop;
     pPoolTop = pPoolTop -->pNext;
     pPoolTop -->pPrev = Null;
     page -->pPrev = pPoolBottom;
     pPoolBottom -->pNext = page;
     pPoolBottom = page;
  }
  return descriptor;
}
```

*FIG. 9B*

```
/* Call this function to return a buffer to the pool */
PoolBufferReturn (DESCRIPTOR *descriptor)
{
  PAGE_GROUP *page;

/* Return descriptor to its own page group. */
  page = &pageGroup [descriptor -->pageGroupId];
  page -->pDescriptor [page -->putIndex] = descriptor;
  page -->emptyFlag = FALSE;
  page -->putIndex++;
  if (page -->putIndex --> = 10)
     page -->putIndex = 0;

if (page ! = pPoolTop && page ! = pPoolTop -->pNext
     && page -->putIndex == page -->getIndex)
  {
     /* if this page becomes full, we need to lift its
        status of becoming supplying page because it is recently
        accessed. We do this by putting this page to
        pPoolTop -->pNext as the next candidate for buffer
        supplying page. */
     page -->pPrev -->pNext = page -->pNext
     page -->pNext -->pPrev = page -->pPrev
     pPoolTop -->pNext -->pPrev = page;
     page -->pNext = pPoolTop -->pNext;
     page -->pPrev = pPoolTop;
     pPoolTop -->pNext = page;
  }
}
```

*FIG. 9C*

PAGE-AWARE DESCRIPTOR MANAGEMENT

BACKGROUND

Network processing functions performed by a network processor generally include parsing and examination of information stored in network buffers. Network buffers can be viewed as having two parts: a descriptor and a body. The descriptor is used to store control information about the network buffer and the contents of the body. The body is used store network data (e.g., packets, portions of packets, cells and so forth). Typically, a relatively small amount of the leading data stored in the body of the network buffer (such as header information) is of interest to an application executing on the network processor, while the rest of the network data is merely an "opaque capsule" that is passed from a receive port to some exit port. It is fairly uncommon to pass the contents of the network buffer body through such processing without modifying the leading data in some way.

Quite often, accessing (i.e., reading or writing) the descriptor portion of a network buffer is a necessary part of the data processing. If only a small part of the body is accessed, as is typically the case, the access to the descriptor is a significant percentage of the total buffer memory access for network data processing.

Typically, a pool of available network buffers is managed with a linked list (or circular ring) of descriptors. There are various types of pools, e.g., shared or flow-specific controlled. In a flow-specific controlled pool scheme, each network traffic flow owns a collection of buffers for the use within its own flow only.

When a processing resource of the network processor needs a network buffer (and therefore a descriptor), a descriptor is taken from head of the list. When a network buffer is retired from use by a processing resource and the descriptor for that network buffer is no longer needed, the descriptor is returned to the pool list, usually being placed at the tail of the list.

DESCRIPTION OF DRAWINGS

FIGS. 8A–8D are depictions of changes to the descriptors pool list during example descriptor allocation/de-allocation operations.

FIGS. 9A–9C are example PADM pseudo code.

DETAILED DESCRIPTION

Figure 1:
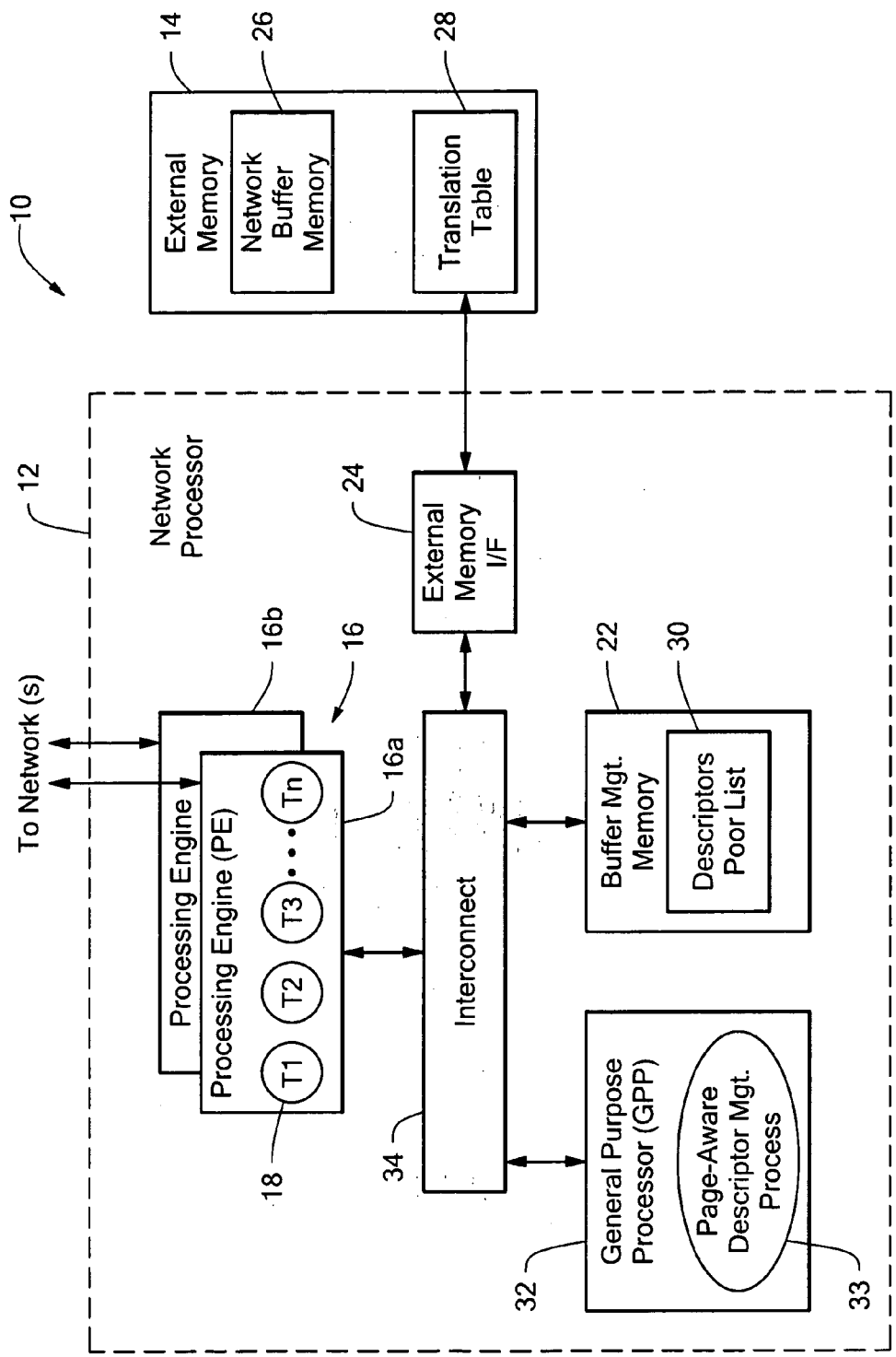
FIG. 1 is a block diagram of an exemplary system having a network processor that employs a page-aware descriptor management (PADM) process to manage page-based groupings of buffer descriptors.

Referring to FIG. 1, a system 10 includes a network processor 12 coupled to external memory 14. The network processor 12 includes one or more processing elements (PEs) 16, each capable of processing multiple execution threads ("n" threads) 18. The PEs 16 are configured to perform functions such as physical and data link layer processing tasks.

One of the PEs 16 (PE 16a) may be configured as a framing/MAC device, e.g., for connecting to 10/100BaseT Ethernet, Gigabit Ethernet or other types of networks. Another PE, PE 16b, can be used to support high-speed serial (HSS) traffic, such as time-division-multiplexed (TDM) traffic carried over a serial channel, as well as Asynchronous Transfer Mode (ATM) traffic. Other types of network protocols may be supported as well.

The system 10 includes various memory resources, including the external memory 14 as well as a buffer management memory 22. The external memory 14, accessed through an external memory interface 24, includes a network buffer memory 26 and a translation table 28. The buffer management memory 22 is a local memory that stores various data structures, in particular, a descriptors pool list 30, as will be described in more detail below.

As illustrated in FIG. 1, the network processor 12 includes yet another processing resource, shown as a general purpose processor (GPP) 32, sometimes also called a host processor, that may perform general-purpose computer type functions, such as handling protocols and exceptions, as well as higher layer network processing tasks that cannot be handled by the PEs 16. Included among the tasks performed by the GPP is buffer management. In particular, the GPP is configured or programmed to execute a Page-Aware Descriptor Management (PADM) process 33. The PADM process 33 makes use of the data structures in the buffer management memory 22. Thus, it may be desirable to implement the buffer management memory 22 as a cache to the GPP 32. The details of the PADM process 33 and related data structures will be described below.

Each of the functional units of the network processor 12 is coupled to an internal bus structure or interconnect 34 to enable communications between the various functional units. Other devices, such as a host computer and/or bus peripherals, which may be coupled to an external bus controlled by a bus controller (not shown), can also serviced by the network processor 12.

When the network processor 12 is executing a network processor application, such as an Ethernet bridge, Internet Protocol (IP) router or wireless access point application, to give but a few examples, the operations of the network processor 12 include receive/transmit activities. The receive/transmit activities typically performed by the PEs 16, involve moving units of data (e.g., packets and/or cells) into and out of the network buffers of the network buffer memory 26 (in the external memory 14). The allocation and release (or de-allocation) of network buffers is managed by the GPP 32. During data processing, a PE 16 or the GPP 32 (or both) may examine and even modify the contents of the network buffers. Pointers to the network buffers are passed between the GPP and PEs according to the work to be done.

Figure 2:
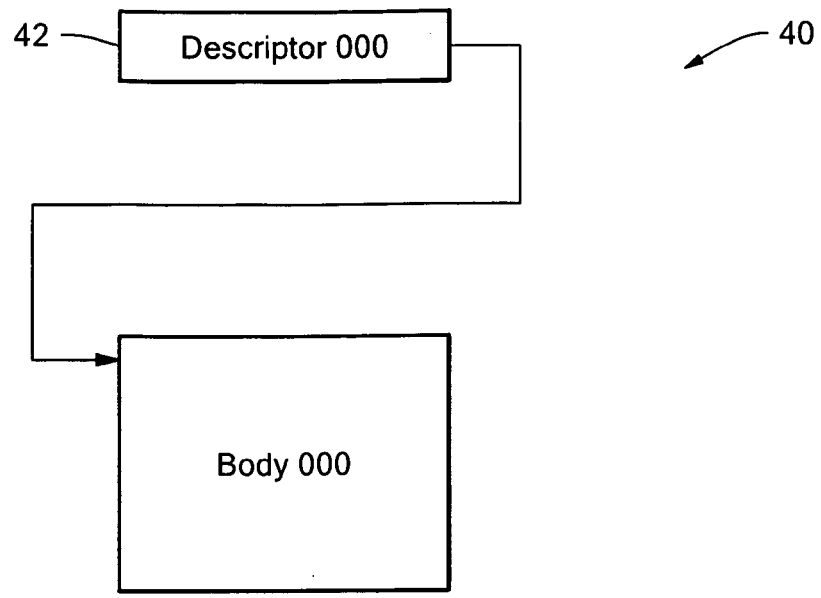
FIG. 2 is representation of a network buffer as a body and descriptor.

As shown in FIG. 2, an exemplary network buffer 40 includes a buffer descriptor (hereinafter, simply, "descriptor") 42, which contains control information about the network buffer and the content of the buffer, and a body 44 that contains actual network data. The descriptor 42 is typically much smaller than the body 44 of the network buffer. For example, the size of a descriptor could be 16 bytes to 64 bytes, while the size of the body could be 1500 byte to 2000 bytes, typically. The descriptor 42 may include such information as a pointer to the body 44. The descriptor 42 and the body 44 do not necessarily reside next to each other in the physical memory. In fact, for various reasons, they are often located in separate areas of external memory.

Figure 3:
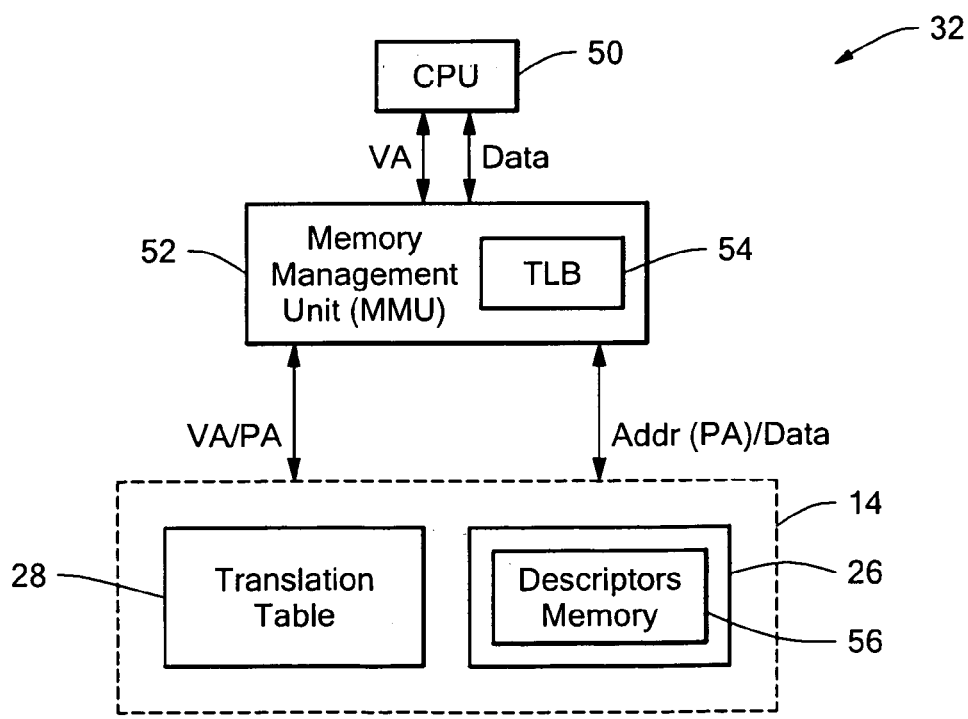
FIG. 3 is a depiction of a processor (in the network processor of FIG. 1) that accesses the descriptors using a Memory Management Unit (MMU).

Referring to FIG. 3, the GPP 32 includes a CPU 50 coupled to a Memory Management Unit (MMU) 52. The MMU 52 includes a small cache referred to as Translation Look-aside Buffers (TLB) 54. Among other functions, the MMU 52 translates between virtual memory addresses (VA) and physically addresses (PA). It does so by dividing memory into pages. A page of memory is typically 4 or more Kbytes. The translation table 28 (of the external memory 14 from FIG. 1, and shown here in dashed lines) is maintained and used by the MMU 52 to keep the translation relations for all pages. The translation table 28 stores some number of per-page entries, each entry containing VA to PA translations for each memory location of a given page. A small portion of the translation table, more specifically, a small number of recently accessed entries, are kept in the TLB 54. Of course, the MMU 52 responds much faster to the CPU 50 if the translation entry for a page to be accessed is in TLB 54 than if the entry is in the slower external memory 14. Among the addresses requiring translation are the addresses of descriptors (in descriptors memory 56), which are accessed frequently during network data processing and typically represent a significant percentage of the total external memory access for processing one data unit, such as a packet.

In conventional network processors, as discussed above, a "pool" of available descriptors is typically managed as a linked list (or a circular ring) of descriptor pointers. When a descriptor is needed, a descriptor pointer is taken from the head of the pool list. When a descriptor is no longer in use, the pointer to that descriptor is returned to either the tail or head of the pool list.

An inefficiency is observed in this conventional type of buffer descriptor management scheme when a memory management unit (MMU) is used. For example, assume a pool list is orderly arranged in memory and some number of descriptors, say, ten, require one page of memory. Initially, the first ten descriptors (associated with a page) to handle the first ten incoming packets are removed from the pool list, one after another, and are accessed (read or write) for a processing job. When the descriptors are accessed, the same page is likely to be hit in the TLB of the MMU, resulting in a fast response from the MMU. After some time, because of different lengths of packets, different destinations of the outgoing network interfaces and different network protocol types in the packets, the descriptors of the network buffers being used are de-allocated (their pointers returned to the pool list) in a different order than that in which they were allocated (their pointers were removed from the pool list). As a result, the current pool list reflects a list of descriptors whose memory locations are randomized in relation to the MMU pages. That is, while a given MMU page in memory may contain memory locations 0 through 9 allocated to 10 descriptors, those same 10 memory locations may no longer appear as consecutive entries in the pool list. Consequently, when another ten descriptor pointers are taken from the list and the corresponding descriptors are accessed, different MMU pages may be hit. The likelihood that translation entries for these pages are in TLB is greatly reduced. The MMU is forced to cache in and out of translation entries from the TLB all the time, resulting in a slow MMU response and causing execution cycle stalls in the CPU.

Accordingly, to address this problem, the network processor 12 employs the PADM process 33 and related data structures, including the descriptors pool list 30, to maintain a relationship between buffer descriptors and MMU memory pages during descriptor allocation/de-allocation. This page awareness in the descriptor management serves to maximize the probability of a MMU TLB hit by minimizing the number of pages used by descriptors currently in circulation. Three key underlying assumptions of the PADM process 33 are the following: i) the fewer pages in circulation, the higher the chance of a TLB hit; ii) a free descriptor that is taken from the descriptors pool list is likely to be accessed soon thereafter; and iii) a descriptor that is returned to the descriptor pool is likely to have been accessed very recently. Thus, the buffer descriptor management scheme of the PADM process 33 is more efficient than conventional schemes used in network software.

Figure 4:
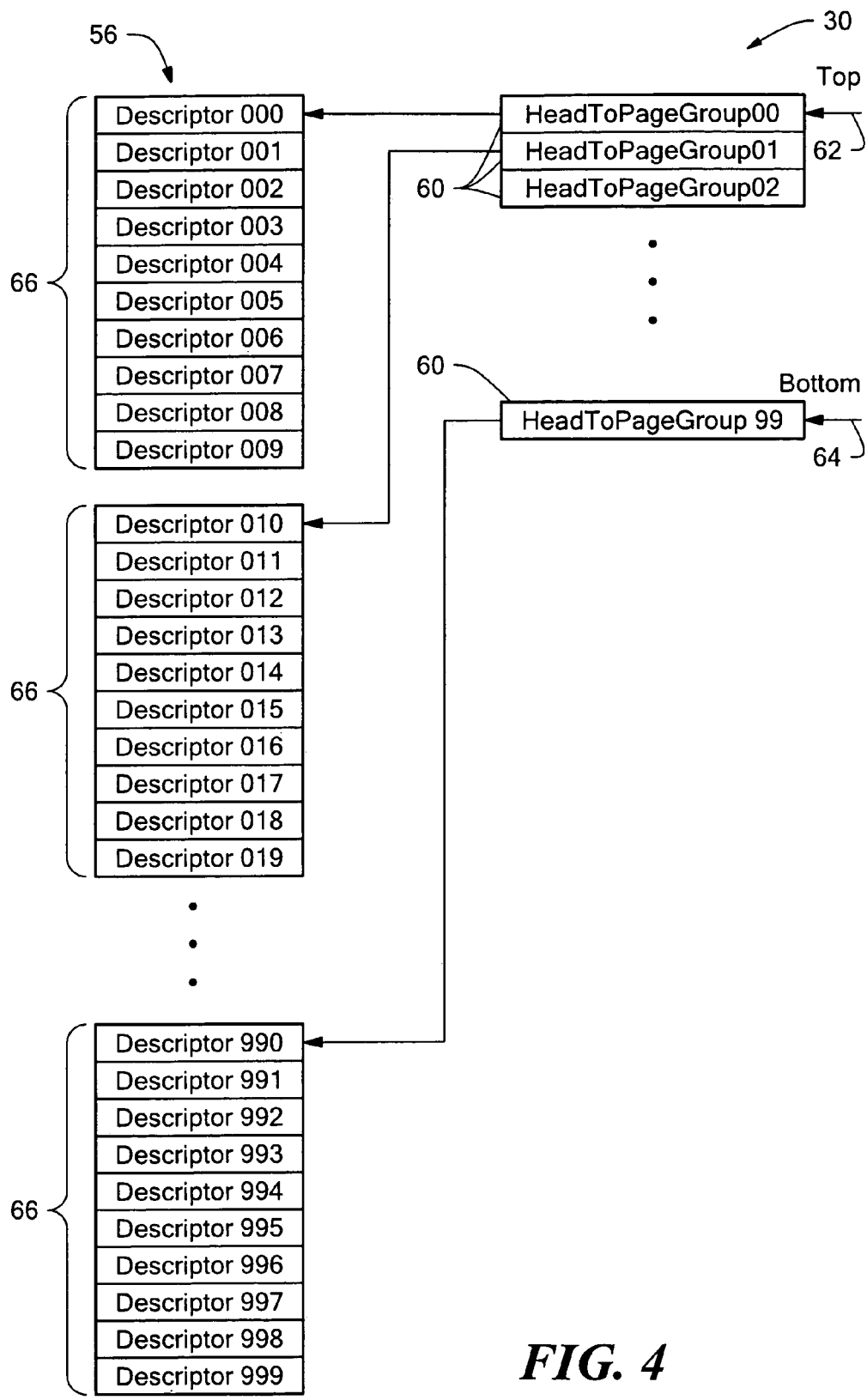
FIG. 4 is a depiction of PADM descriptor data structures, including a descriptors pool list.

According to the PADM mechanism, and referring now to FIG. 4, the descriptors pool list 30 is organized as a list of elements 60 representing page groups (and thus also referred to as a "page groups list"), with a top pointer 62 indicating the element at the top of the list and a bottom pointer 64 indicating the element at the bottom of the list. Descriptors 42 in the descriptors memory 56 are grouped into page groups 66. All descriptors in the same page group reside on the same MMU page of the descriptors memory. Each page groups list element 60 in the page groups list 30 describes and points to a different one of the page groups 66, as shown. In the illustrated example, there are a thousand descriptors in the descriptors memory 56, and ten descriptors fit into one page (and thus make up a page group).

Figure 5:
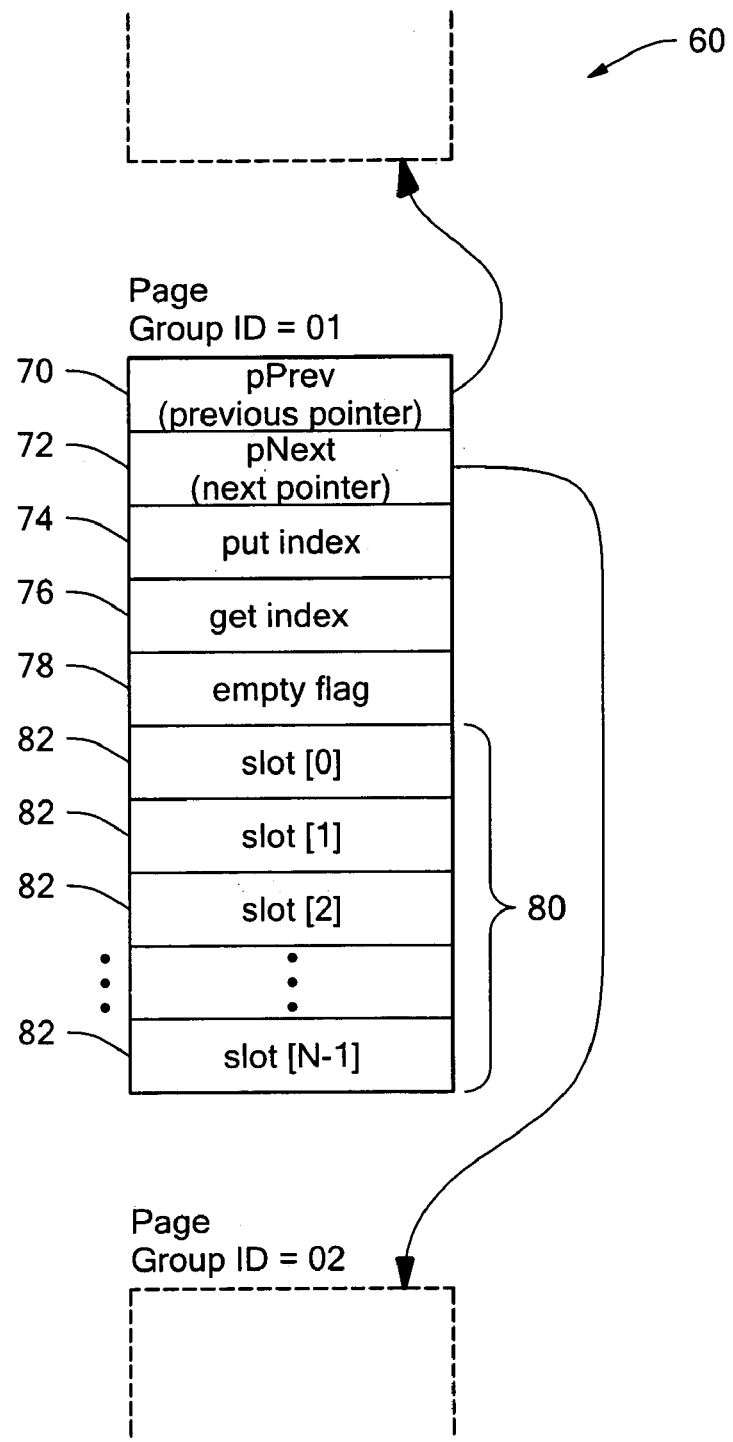
FIG. 5 is an illustration of an exemplary layout of an element in a descriptors pool (i.e., a list of many such elements).

FIG. 5 shows an exemplary layout of a page groups list element or entry 60. The page groups list element 60 corresponding to a given page group 66 (shown in FIG. 4) includes the following: a previous pointer ("pPrev") 70 that points to the previous page groups list element in the list; a next pointer ("pNext") 72 that points to the next page groups list element in the list; a put index 74; a get index 76; an empty flag 78; and a ring 80 of descriptor slots or buffers 82. The descriptor slots 82 are indexed 0 through N−1, where N is the number of descriptors in a page group (N being equal to 10 in the illustrated example). Initially, the slots 0 through N−1 store pointers to descriptors 0 through N−1 in the page group to which the page groups list element corresponds. The get index 76 maintains the index of the descriptor slot from which a descriptor pointer may be read when a descriptor is to be allocated for use. The put index 74 maintains the index of the descriptor slot to which a descriptor pointer is to be written when a descriptor is retired from use.

The PADM process 33 defines and initializes these data structures, including the page groups list 30 and the descriptors themselves. Stored in a field in each descriptor is the ID of the page group to which that descriptor belongs. Both the get index and the put index are initialized with zero values so that they point to slot [0], and the empty flag 78 is set to a FALSE value. As mentioned above, during initialization, slots [0] through {N−1} are written with the pointers to descriptors 0 through N−1, respectively. Thus, after initialization, the get index and the put index of a page groups list element each point to the first descriptor in that page group, via slot [0].

It will be appreciated that there are two conditions under which the get index and the put index indicate the same descriptor: first, when the page group is "full", that is, all descriptors in the page group are in the descriptors pool list and available for use; and second, when the page group is "empty", which occurs when the get index has wrapped around to the same slot position as the put index. When the latter condition occurs, with the get index equal to the put index, the empty flag 78 is set to TRUE to indicate that all of the descriptors in the page group are in use. When a page groups list element has an "empty" condition, that page group element is moved to the bottom of the page groups list by manipulating the bottom and top pointers to the page groups list, as well as updating the previous pointer 70 and next pointer 72 in any page groups list element that is affected by the move, as appropriate.

Figure 6:
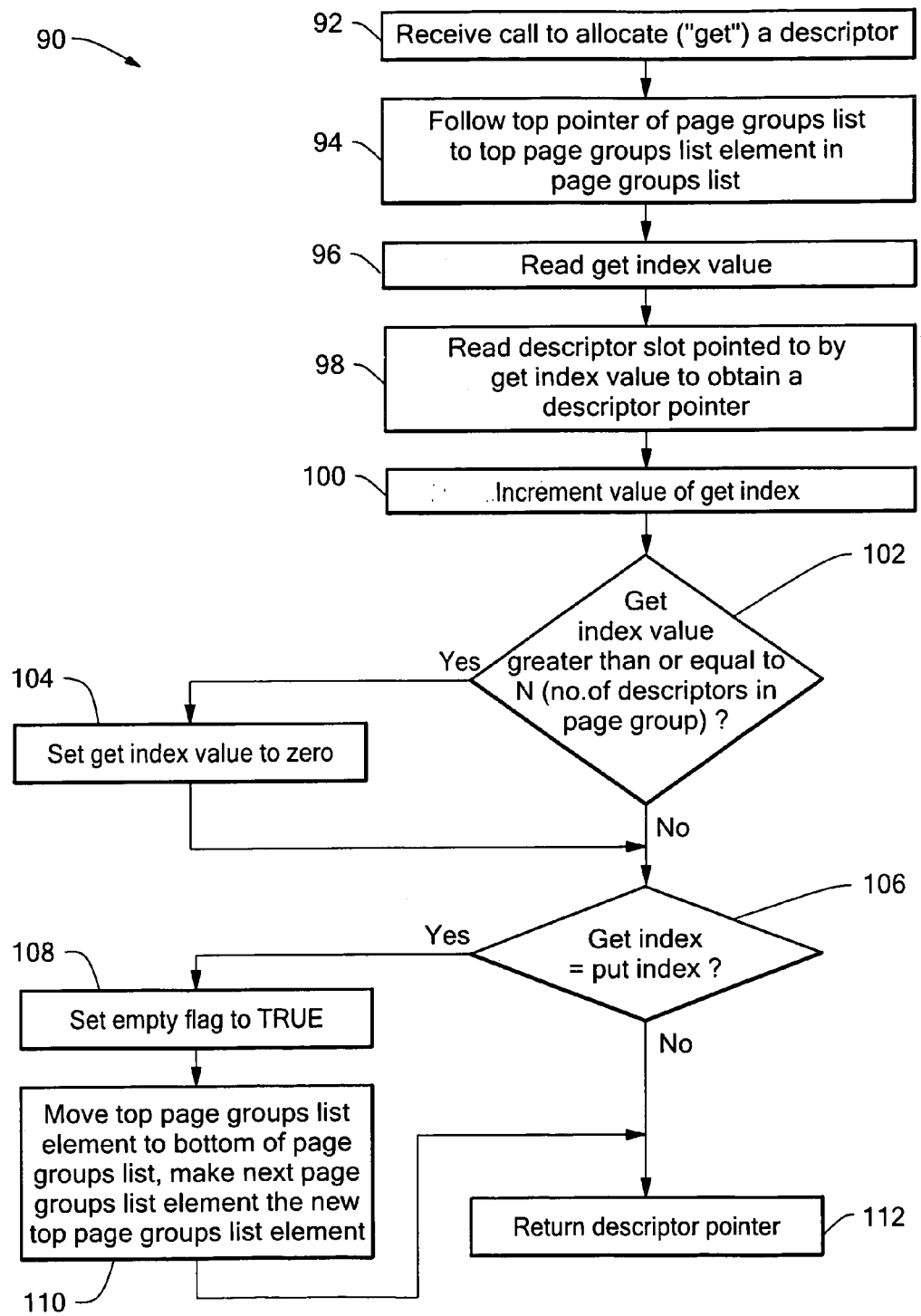
FIG. 6 is a flow diagram illustrating an exemplary portion of the PADM usable to allocate a descriptor.

Referring to FIG. 6, a descriptor allocation ("get descriptor") process or routine 90 of the PADM process 33 operates as follows. The process 90 receives 92 a call to allocate a descriptor for use by a processing resource, such as one of the PEs 16 or the GPP 32, but initiated by GPP 32 (i.e., the GPP 32 initiates the allocation of the buffer, but the buffer may be used by both PE 6 and GPP 32 during the buffer's life). The process 90 follows 94 the top pointer to the top page groups list element. The process 90 reads 96 the "get index" value. The process 90 reads 98 the descriptor slot indicated by the read get index value. The process 90 increments 100 the value of the get index. The process 90 determines 102 if the get index value is greater than or equal to the number of descriptors in a page group ("N"). If it is determined that the get index value is greater than or equal to N, the process 90 sets 104 the get index value to zero. Otherwise, or after the process 90 sets the get index value to zero, the process 90 determines 106 if the values of the get index and the put index are equal. If they are equal, the process 90 sets 108 the empty flag to 'TRUE' and moves the current top page groups list element to the bottom of the list so that the page groups list element pointed to by the next pointer is the new top page groups list element. The process 90 returns the descriptor pointer to the requesting processing resource.

Figure 7:
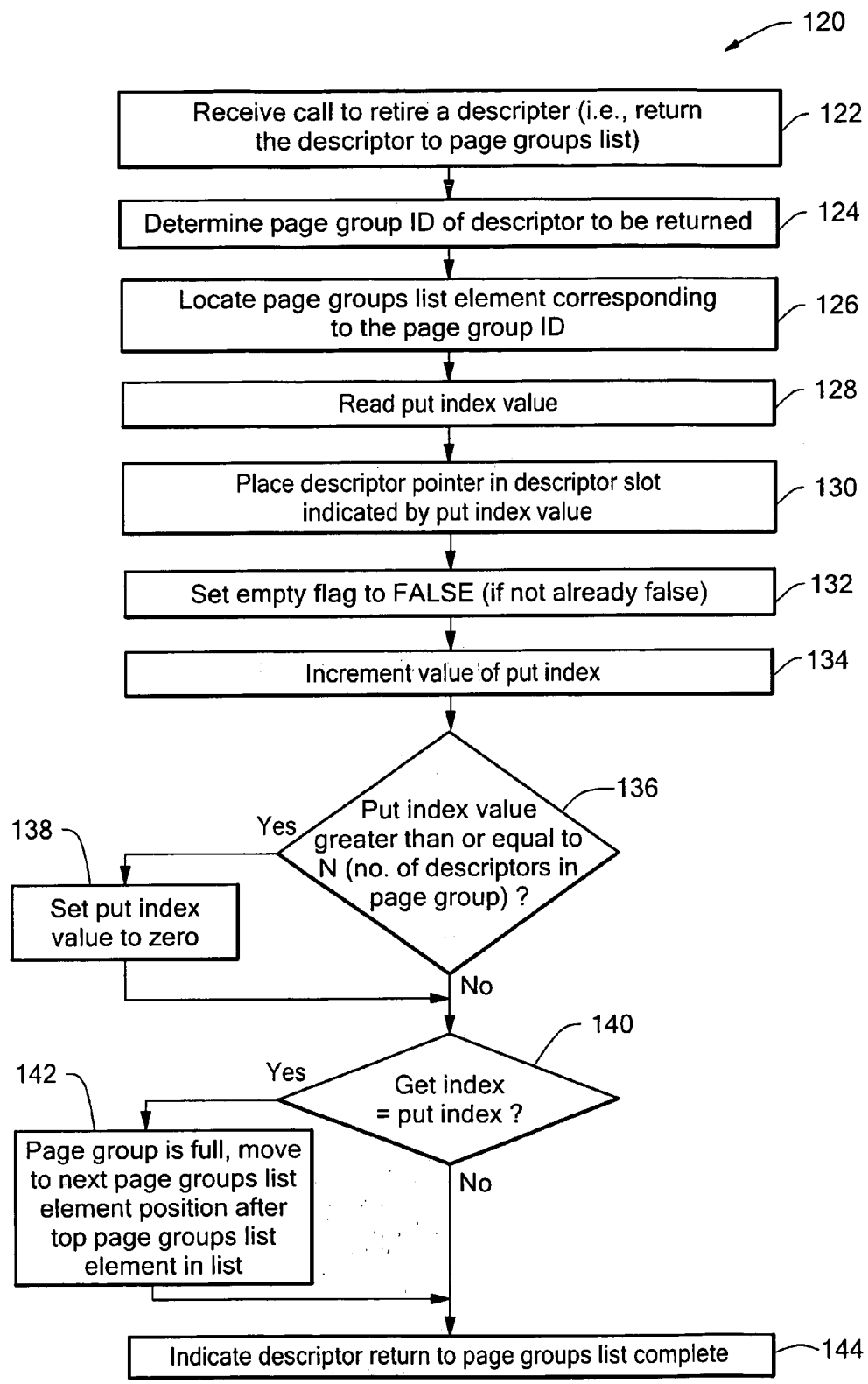
FIG. 7 is a flow diagram illustrating an exemplary portion of the PADM process usable to retire (or de-allocate) a descriptor.

Referring to FIG. 7, a descriptor de-allocation process or routine 120 of the PADM process 33 operates as follows. The process 120 receives 122 a call to de-allocate a descriptor after the descriptor is no longer needed by the processing resource that was using it. The process 120 first determines 124 the ID of the page group to which the descriptor belongs. The process 120 locates 126 the page groups list element with that ID. The process 120 reads 128 the "put index" value. The process 120 stores 130 the descriptor pointer for the descriptor in the descriptor slot indicated by the put index. The process 120 sets 132 the empty flag to 'FALSE' (if it is not already set to 'FALSE') and increments 134 the value of the put index. The process 120 determines 136 if the put index value is greater than or equal to the number of descriptors in a page group ("N"). If it is determined that the put index value is greater than or equal to N, the process 120 sets 138 the put index value to zero. Otherwise, or after the process 120 sets the put index value to zero, the process 120 determines 140 if the values of the get index and the put index are equal. If they are equal, the process 120 moves 142 the current page groups list element to a position in the list immediately following the top page groups list so that it is the next element in line for access once the current top page groups list element transitions to an empty status. The process 120 indicates 144 that the requested return of the descriptor to the pool list is complete As a result of the PADM processing, a significant improvement in throughput may be achieved, as the descriptors in circulation are concentrated in as few MMU pages as possible. Also, page groups having descriptors that have been recently accessed and likely to accessed again in the near future are elevated in list position for more immediate re-use. This measure serves to increase the probability that that translation entries for those pages will be found in the TLB.

It will be appreciated that, although the PADM code and control data may be somewhat more complex than traditional memory management code and control data, these code and control data can be stored in network processor's local memory, i.e., cached. Depending on the clock speed of GPP 32, the cached memory access can be faster than external memory by 10s to 1000s faster. Thus, the PADM process 33 can run very fast.

Figures 8A, 8B:
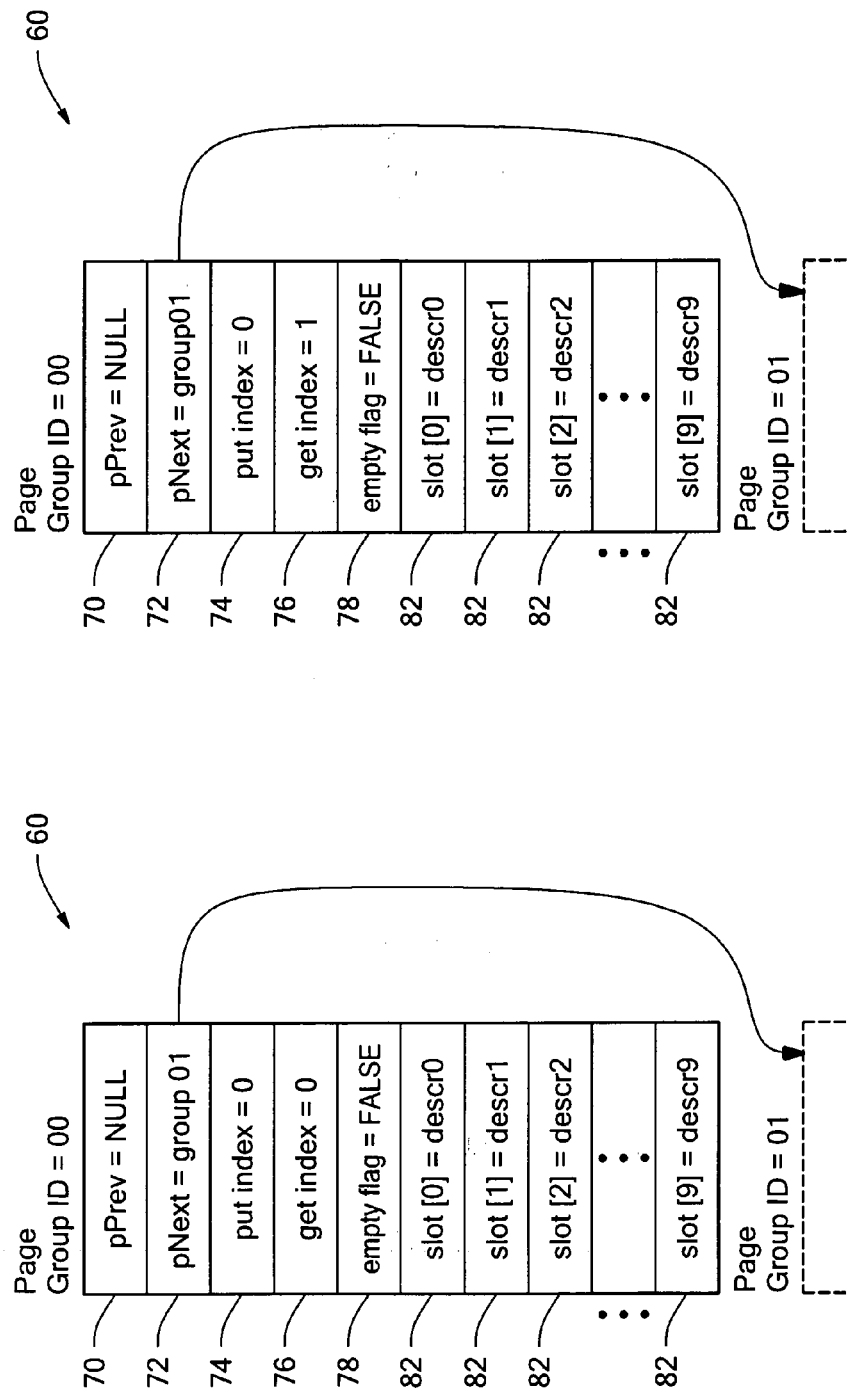

FIGS. 8A through 8D illustrate examples of allocating and de-allocating descriptors, and the resulting changes to the control data. In the examples, a page group of 10 descriptors is assumed. Turning first to FIG. 8A, the contents of a top page groups list element having an ID=00 after initiation is shown. The previous pointer 70 indicates a NULL value, as the element is at the top of the list. In the example shown, the next element in the list is the page group having the ID=01, so the next pointer 72 provides a pointer to the element with the ID of '01'. The put index 74 and get index 76 are set to zero. Thus, they both point to the first slot, slot [0]. The empty flag indicates a 'FALSE' condition, as the page group represented by this element is full, that is, all of the descriptors in the page group are available for use. The slots are written with consecutive descriptor pointer values for the ten descriptors in the page group ('descr0', descr1', 'descr2' . . . , 'descr9')

Consider now the changes to the page groups list element after first and second "get descriptor" operations have been performed, as illustrated in FIGS. 8B–8C. The only piece of control information to be changed is the value of the get index 76. After the first "get descriptor" operation has allocated descriptor 000 by returning pointer 'descr0', and referring to FIG. 8B, the get index 76 has been incremented to indicate a value of '1' and thus points to slot [1] as the slot containing the pointer 'descr1' for the next available descriptor, descriptor 001. After a second "get descriptor" operation has allocated descriptor 001 by returning pointer 'descr1', and referring to FIG. 8C, the get index 76 has been incremented to indicate a value of '2'and thus points to slot [2] as the slot containing the pointer 'descr2' for the next available descriptor, descriptor 002.

Suppose now that the processing resource using descriptor 001 no longer needs the descriptor. After a return of the pointer 'descr1' for this descriptor to the pool list, the page groups list element is as shown in FIG. 8D. As a result of the operation, the slot [0] has been written with the pointer 'descr1' and the put index value has been incremented to '1' to indicate slot [1] as the slot to which the next returned descriptor's pointer is to be written.

FIGS. 9A–9C show example PADM pseudo code. FIG. 9A shows a first code portion 150 that implements the definition and initialization of the PADM data structures, as discussed above. FIG. 9B shows a second code portion 152 that implements the descriptor allocation process 90 described above with reference to FIG. 6. FIG. 9C shows a third code portion 154 that implements the descriptor de-allocation process 120 described above with reference to FIG. 7.

Figure 10:
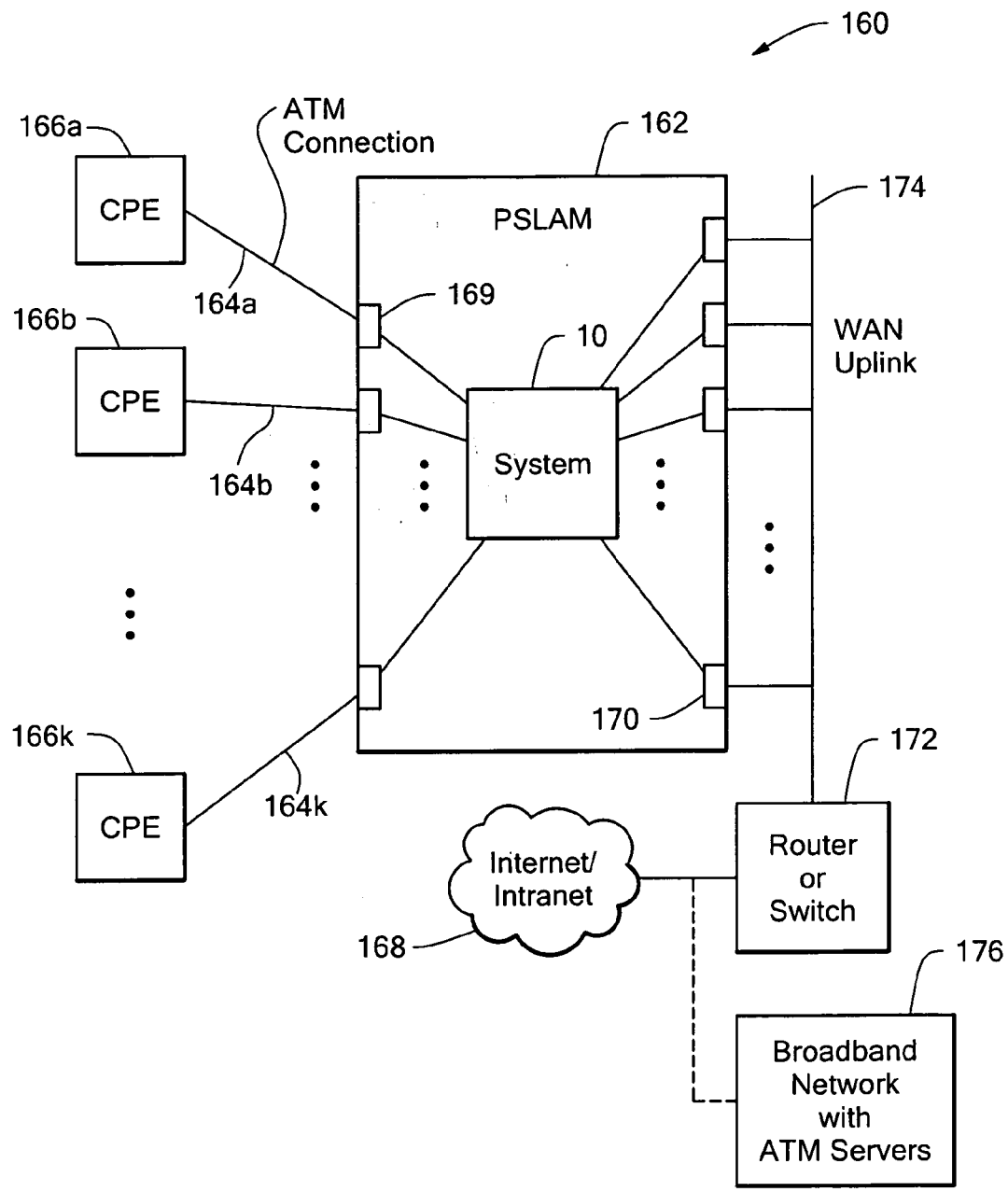
FIG. 10 is a block diagram of an exemplary network environment that illustrates a Digital Subscriber Loop Access Multiplexer (DSLAM) application of the network processor of FIG. 1.

A network processor such as network processor 12 that uses the PADM scheme can be employed in a number of different networking applications. One example is shown in FIG. 10. Referring to FIG. 10, a DSL network environment 160 includes a DSL aggregation device 162, shown as a Digital Subscriber Loop Access Multiplexer (DSLAM), which concentrates connections 164a, 164b, . . . , 164k, from DSL access points 166a, 166b, . . . , 166k, for access to a service network such as the public Internet (or a corporate Intranet) 168. The DSL access points 166 typically correspond to Customer Premises Equipment (CPE). The CPE can take a variety of different forms, e.g., a DSL modem used by a home consumer, or a Small Office/Home Office (SOHO) router, and so forth. The connections 164 between the CPE 166 and the DSLAM 162 are usually ATM connections. The DSLAM 162 can be deployed in the service provider environment, as shown.

The DSLAM 162 can be characterized as having a CPE side with first port interfaces 169 for handling ATM cell-based traffic associated with corresponding DSL links or connections 164, and one or more second port interfaces 170, which are coupled to a router (or ATM switch) 172 via a WAN uplink connection 174. The router/switch 172 connects to a service network, such as the Internet 168, as indicated earlier, or some other type of service network, for example, an ATM network 176. Thus, for upstream traffic, many DSL ports on the CPE side may be aggregated at the DSLAM 162 and, on the service provider side, connected to the service network router with a single physical port interface. The first port interfaces 169 may be cell-based and the second port interfaces 170 may handle frames (or packets).

In one embodiment, the DSLAM 162 includes a system like system 10, which it uses to handle traffic to be sent from the service network to one of the CPEs 166 (that is, traffic flowing in the downstream direction). Thus, the network processor 12 may be used to segments packets into ATM cells, which are transmitted to a CPE over a medium via one of the interfaces 169. The network processor 12 may also perform traffic scheduling and shaping. Besides the DSLAM application shown in FIG. 10, other possible applications include, for example, wireless access point, bridge and router applications.

In the illustrated embodiment, the GPP 32 performs the buffer management. Alternatively, the PADM process 33 could execute in a separate, dedicated controller. Also, it will be understood that the page groups list 30 could be maintained or cached in a local memory in any processing resource that executes the PADM 33 process for even higher performance.

Other embodiments are within the scope of the following claims.

What is claimed is:

1. A method comprising:
   providing network buffer descriptors grouped by memory page into page groups;
   accessing a list of the page groups to manage the use of the network buffer descriptors by one or more processing "resources; and wherein the accessing comprises allocating and de-allocating the network buffer descriptors".

2. The method of claim 1 wherein size of the memory page is defined as a predetermined number of the network buffer descriptors.

3. The method of claim 1 wherein the list of page groups comprises a linked list of elements associated with the page groups, and each element points to the page group with which such element is associated.

4. The method of claim 3 wherein each element includes slots to store pointers to the network buffer descriptors in the page group with which the element is associated.

5. The method of claim 4 wherein allocating comprises:
   allocating one of the network buffer descriptors for use by removing the pointer for the network buffer descriptor from the element that is currently at the top of the page groups list.

6. The method of claim 5 wherein de-allocating comprises:
   retiring an allocated one of the network buffer descriptors from use by returning the pointer for the network buffer descriptor to the element associated with the page group to which such network buffer descriptor belongs.

7. The method of claim 6 wherein accessing further comprises:
   maintaining in each element control information usable to indicate if at least one, none or all of the network buffer descriptors in the page group with which the element is associated can be allocated for use.

8. The method of claim 7 wherein accessing further comprises:
   elevating the element to a higher position in the page groups list if the control information indicates that all of the network buffer descriptors in the page group with which the element is associated can be allocated for use.

9. The method of claim 8 where the higher position corresponds to a position of second from the top of the page groups list.

10. The method of claim 7 wherein accessing further comprises:
    moving the element to the bottom of the page groups list if the control information indicates that none of the network buffer descriptors in the page group with which the element is associated can be allocated for use.

11. An article comprising:
    a storage medium having stored thereon instructions that when executed by a machine result in the following:
    organizing network buffer descriptors by memory page into page groups;
    accessing a list of the page groups to manage the use of the network buffer descriptors by one or more processing "resources; and wherein the accessing comprises allocating and de-allocating the network buffer descriptors".

12. The article of claim 11 wherein size of the memory page is defined as a predetermined number of the network buffer descriptors.

13. The article of claim 11 wherein the list of page groups comprises a linked list of elements associated with the page groups, and each element points to the page group with which such element is associated.

14. The article of claim 13 wherein each element includes slots to store pointers to the network buffer descriptors in the page group with which the element is associated.

15. The article of claim 14 wherein accessing comprises:
    allocating one of the network buffer descriptors for use by removing the pointer for the network buffer descriptor from the element that is currently at the top of the page groups list.

16. The article of claim 15 wherein accessing comprises:
retiring an allocated one of the network buffer descriptors from use by returning the pointer for the network buffer descriptor to the element associated with the page group to which such network buffer descriptor belongs.

17. The article of claim 16 wherein accessing further comprises:
maintaining in each element control information usable to indicate if at least one, none or all of the network buffer descriptors in the page group with which the element is associated can be allocated for use.

18. The article of claim 17 wherein accessing further comprises:
elevating the element to a higher position in the page groups list if the control information indicates that all of the network buffer descriptors in the page group with which the element is associated can be allocated for use.

19. The article of claim 18 where the higher position corresponds to a position of second from the top of the page groups list.

20. The article of claim 17 wherein accessing further comprises:
moving the element to the bottom of the page groups list if the control information indicates that none of the network buffer descriptors in the page group with which the element is associated can be allocated for use.

21. A network processor comprising:
one or more processors coupled to an external memory usable to store network buffer descriptors grouped by memory page into page groups;
a buffer management memory to store a list of the page groups; and
wherein at least one of the one or more processors is configured to access the page groups list to manage allocation and de-allocation of the network buffer descriptors.

22. The network processor of claim 21 wherein at least one of the one or more processors includes a translation table of entries corresponding to address translations for the page groups and translation look-aside buffers to cache a portion of the entries most recently accessed by such processor.

23. A device comprising:
a Digital Subscriber Loop Access Multiplexer that includes a network processor coupled to a memory;
wherein the memory is usable to store network buffer descriptors grouped by memory page into page groups
wherein the network processor comprises a buffer management memory to store a list of the page groups; and
wherein the network processor further comprises one or more processors, and at least one of the one or more processors is configured to access the page groups list to manage allocation and de-allocation of the network buffer descriptors.

24. The device of claim 23 wherein at least one of the one or more processors includes a translation table of entries corresponding to address translations for the page groups and translation look-aside buffers to cache a portion of the entries most recently accessed by such processor.

* * * * *